(12) United States Patent
Matsuo

(10) Patent No.: US 11,541,541 B2
(45) Date of Patent: Jan. 3, 2023

(54) GRIPPING SYSTEM

(71) Applicant: THK CO., LTD., Tokyo (JP)

(72) Inventor: Yoshikazu Matsuo, Tokyo (JP)

(73) Assignee: THK CO., LTD., Tokyo (JP)

(*) Notice: Subject to any disclaimer, the term of this patent is extended or adjusted under 35 U.S.C. 154(b) by 342 days.

(21) Appl. No.: 16/630,670

(22) PCT Filed: Jul. 11, 2018

(86) PCT No.: PCT/JP2018/026212
§ 371 (c)(1),
(2) Date: Jan. 13, 2020

(87) PCT Pub. No.: WO2019/013259
PCT Pub. Date: Jan. 17, 2019

(65) Prior Publication Data
US 2021/0114216 A1  Apr. 22, 2021

(30) Foreign Application Priority Data
Jul. 14, 2017  (JP) .............................. JP2017-138547

(51) Int. Cl.
*B25J 9/16* (2006.01)
*B25J 13/08* (2006.01)
*B25J 15/00* (2006.01)

(52) U.S. Cl.
CPC .......... *B25J 9/1669* (2013.01); *B25J 9/1612* (2013.01); *B25J 13/081* (2013.01); *B25J 15/0009* (2013.01)

(58) Field of Classification Search
CPC ........ B25J 9/1612; B25J 9/1669; B25J 13/02; B25J 13/08; B25J 13/081; B25J 13/082;
(Continued)

(56) References Cited

U.S. PATENT DOCUMENTS

2010/0010670 A1* 1/2010 Matsukuma ........... B25J 9/1612
700/245
2011/0270443 A1* 11/2011 Kamiya ............... G05B 19/401
901/46

(Continued)

FOREIGN PATENT DOCUMENTS

| JP | 2010-172992 A | 8/2010 |
| JP | 2010172992 A * | 8/2010 |
| JP | 5505138 B2 | 5/2014 |

OTHER PUBLICATIONS

International Search Report dated Aug. 28, 2018, issued in counterpart International Application No. PCT/JP2018/026212, with English Translation. (3 pages).

*Primary Examiner* — Khoi H Tran
*Assistant Examiner* — Tanner L Cullen
(74) *Attorney, Agent, or Firm* — WHDA, LLP

(57) ABSTRACT

An object of the present invention is to provide a technique for a gripping system having an arm mechanism and a hand mechanism attached to the arm mechanism, by which an operation of the arm mechanism can be stopped as soon as the hand mechanism contacts an object. In the gripping system according to the present invention, the hand mechanism is provided with a contact detection unit for detecting that a predetermined site of the hand mechanism has come into contact with the object. The hand mechanism is also provided with a signal transmission unit that is electrically connected to an arm control device. The signal transmission unit transmits a command signal to stop the operation of the arm mechanism directly to the arm control device at the point where the contact detection unit detects that the predetermined site of the hand mechanism has come into contact with the object.

4 Claims, 12 Drawing Sheets

(58) Field of Classification Search
CPC ...... B25J 15/0009; B25J 15/08; B25J 9/1666;
B25J 9/1676; B25J 9/1697; B25J 13/085;
G05B 2219/39492; G05B 2219/39532;
G05B 2219/39484; G05B 2219/39251;
G05B 2219/39252; G05B 19/4148; G05B
2219/25232; G05B 2219/1204; G05B
2219/25229; G05B 2219/33273
See application file for complete search history.

(56) References Cited

U.S. PATENT DOCUMENTS

| | | | |
|---|---|---|---|
| 2012/0004774 A1 | 1/2012 | Umetsu | |
| 2012/0290133 A1* | 11/2012 | Goto | B25J 15/0253 294/213 |
| 2014/0148951 A1* | 5/2014 | Saen | G01L 5/009 901/34 |
| 2014/0156066 A1* | 6/2014 | Sakano | B25J 9/1633 700/245 |
| 2015/0081099 A1* | 3/2015 | Komatsu | B25J 13/085 700/258 |
| 2016/0250753 A1* | 9/2016 | Yoshizawa | B25J 15/04 700/258 |
| 2018/0056814 A1* | 3/2018 | Tanyi | B60N 2/002 |
| 2018/0272535 A1* | 9/2018 | Ogawa | B25J 9/1692 |

\* cited by examiner

[Fig. 1]
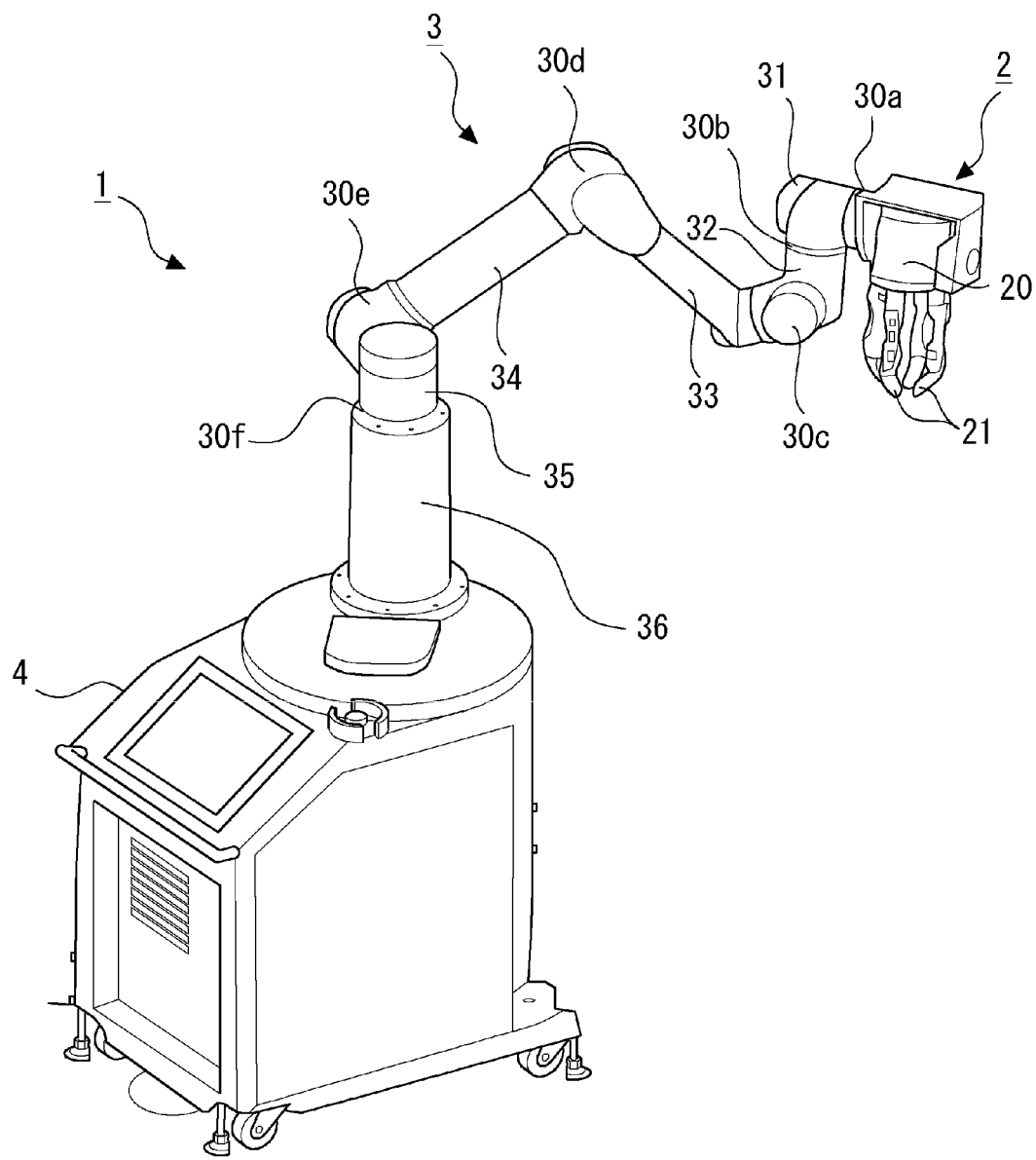

[Fig. 2]
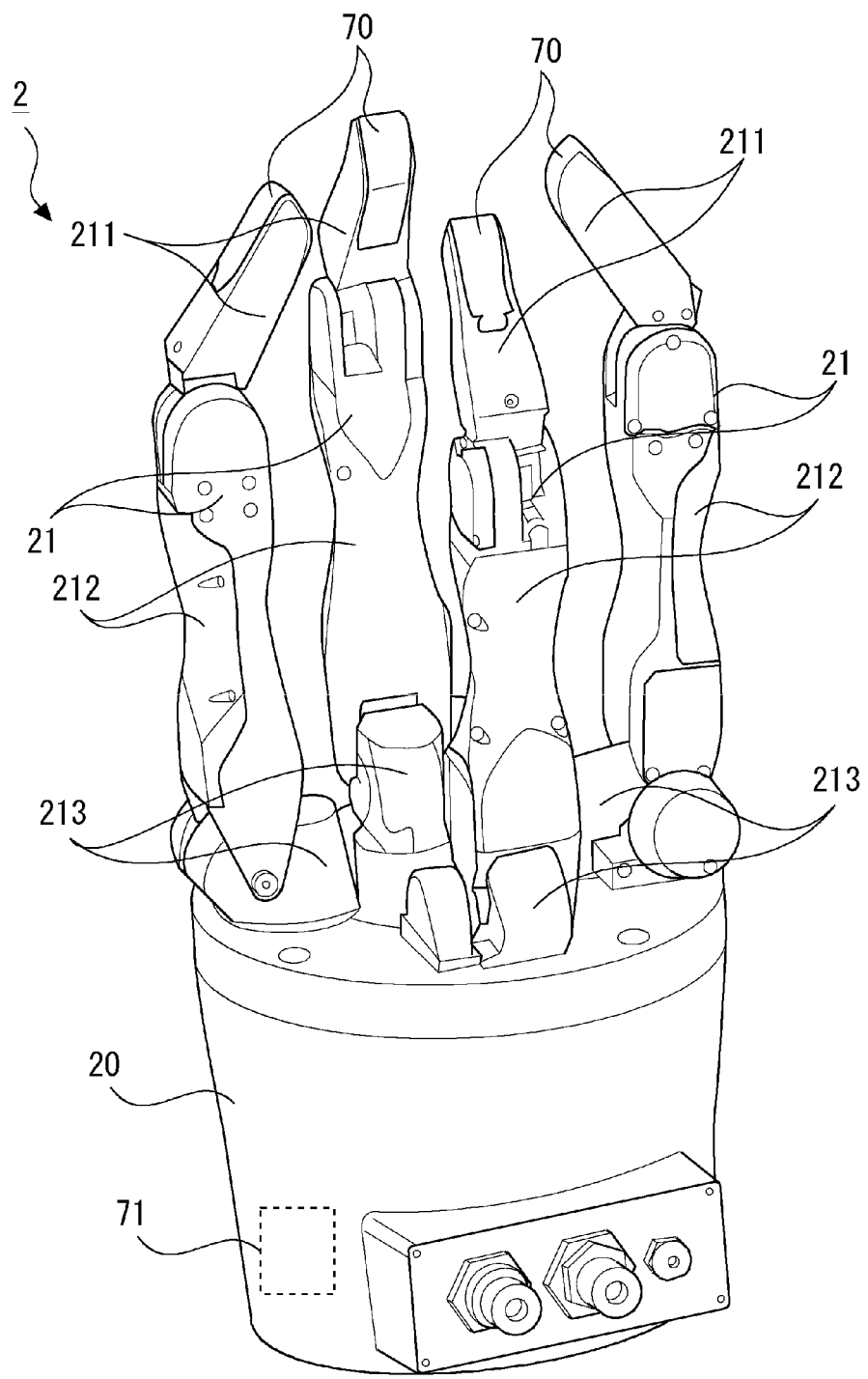

[Fig. 3]
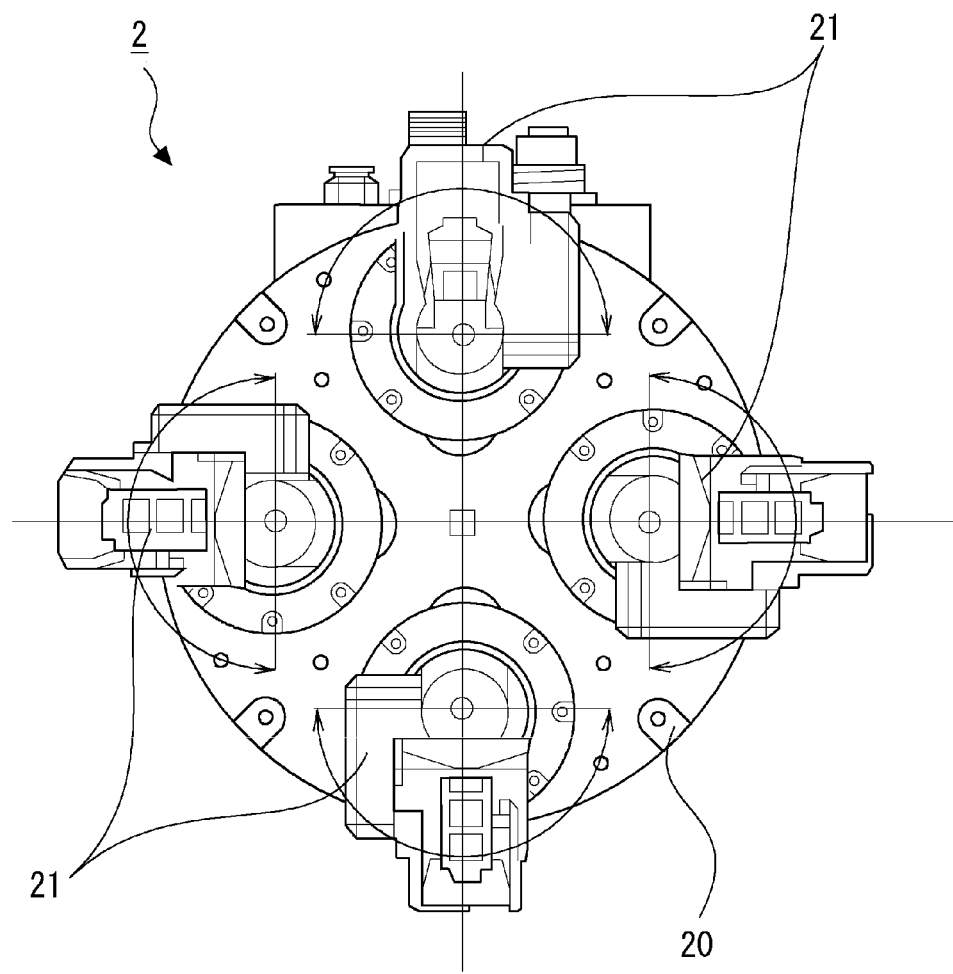

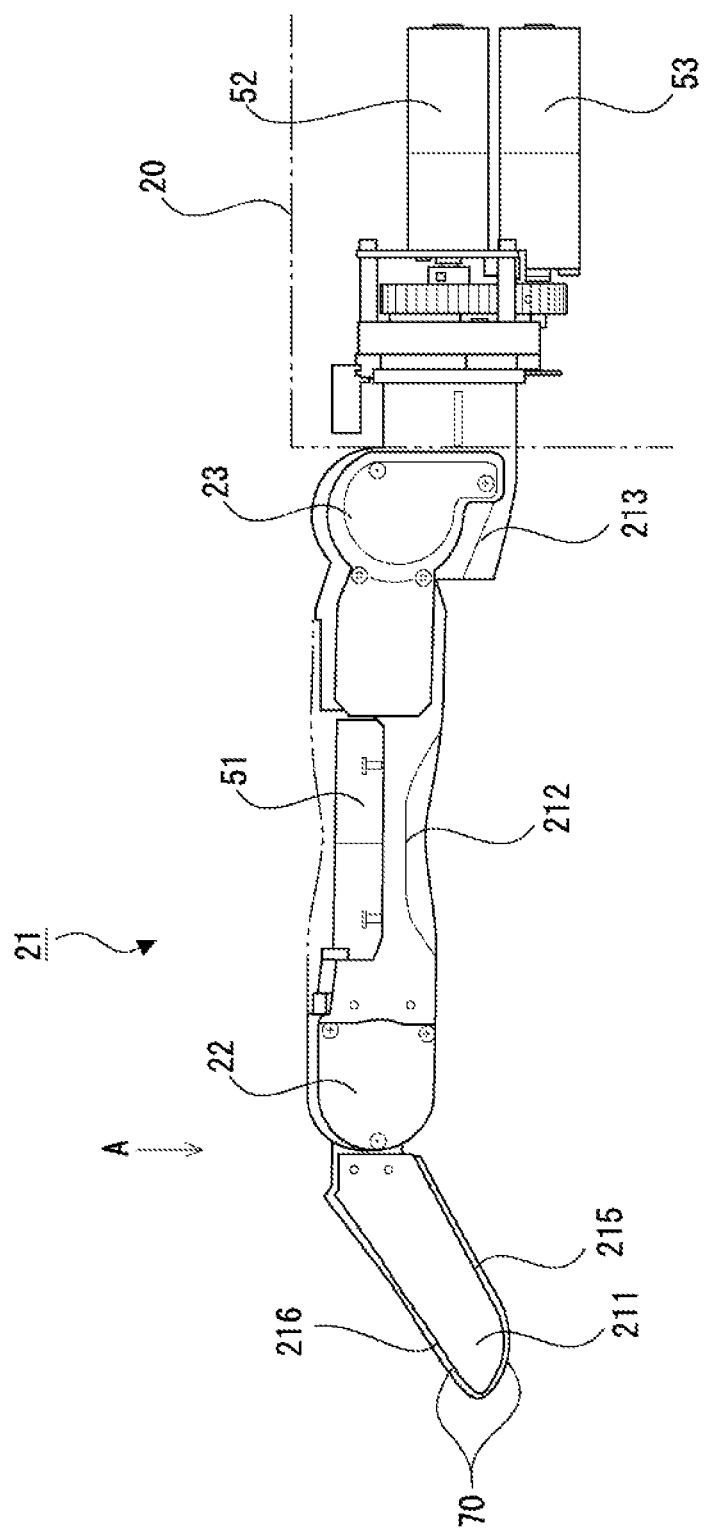
[Fig. 4]

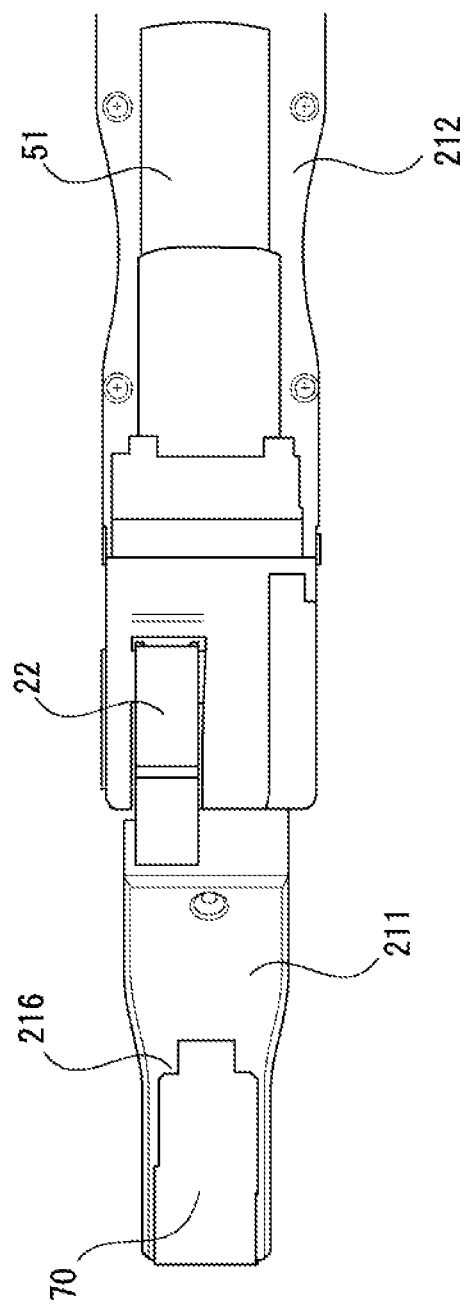
[Fig. 5]

[Fig. 6]
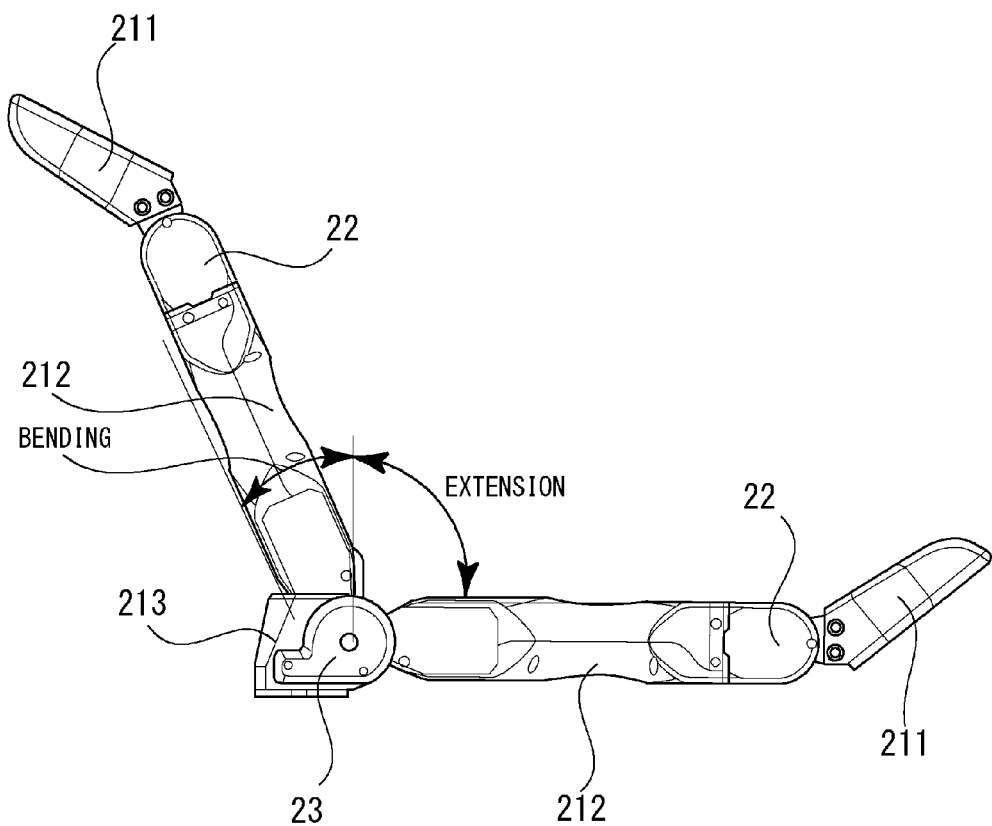

[Fig. 7]
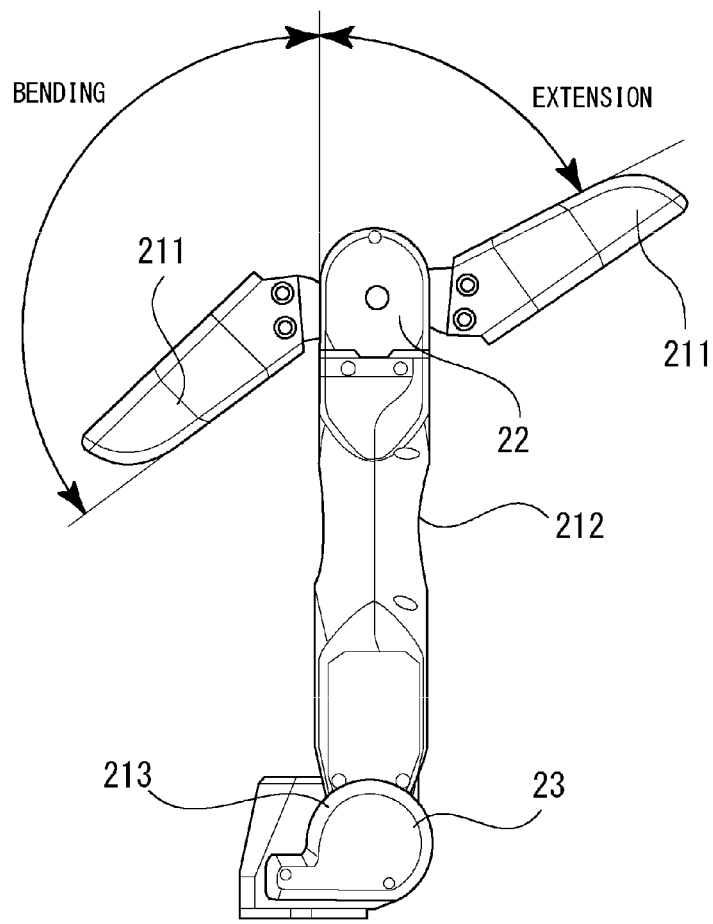

[Fig. 8]
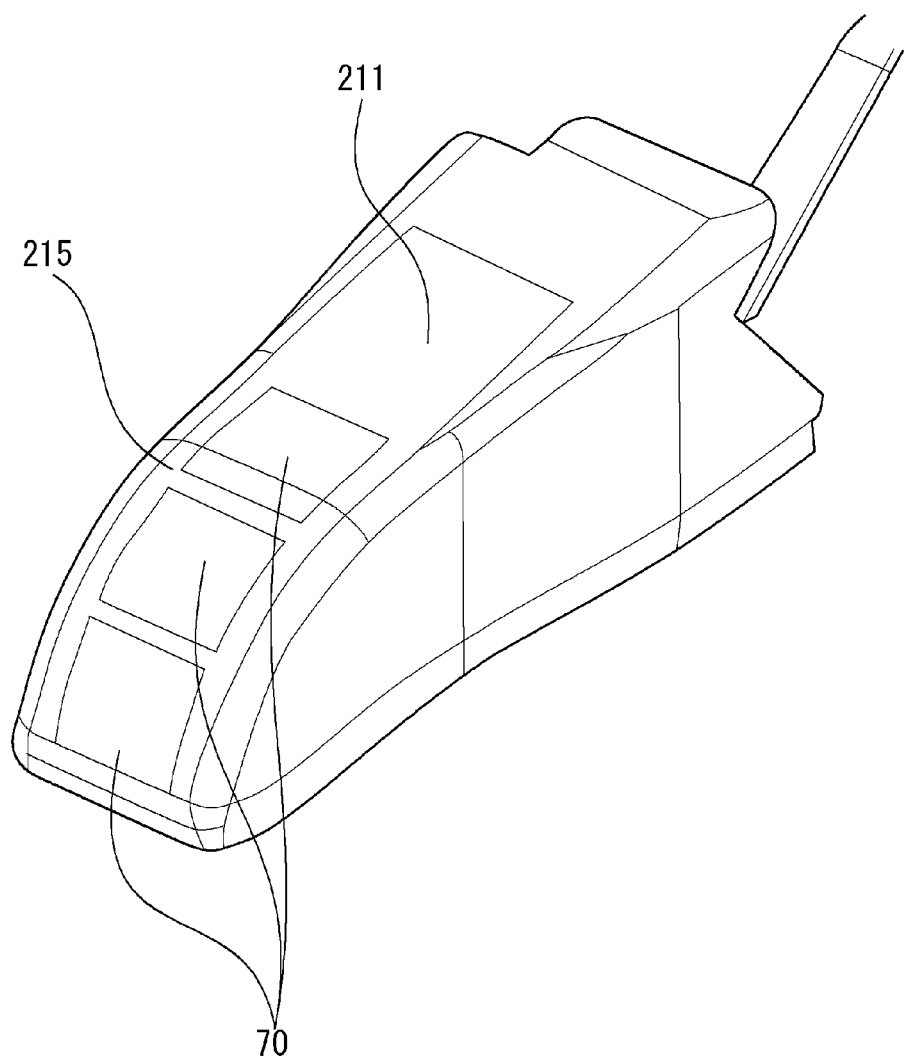

[Fig. 9]
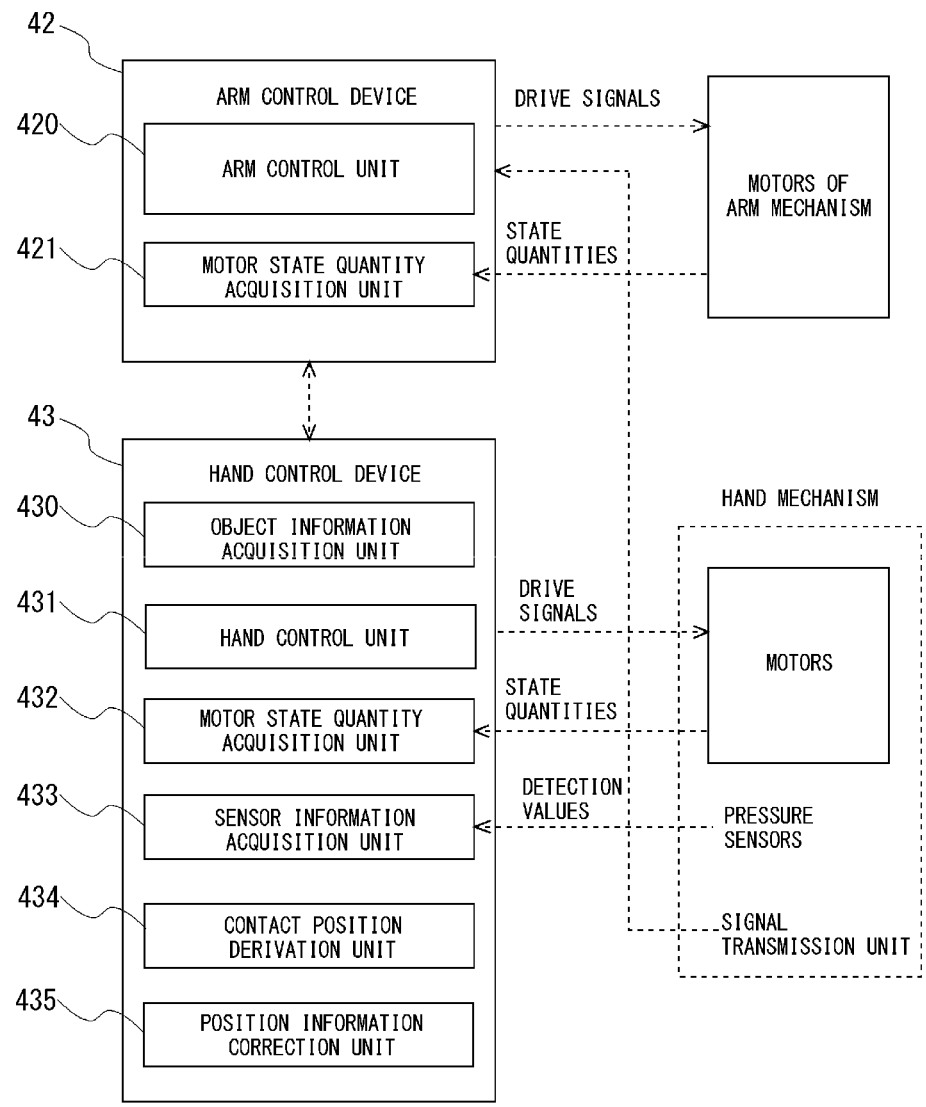

[Fig. 10A]
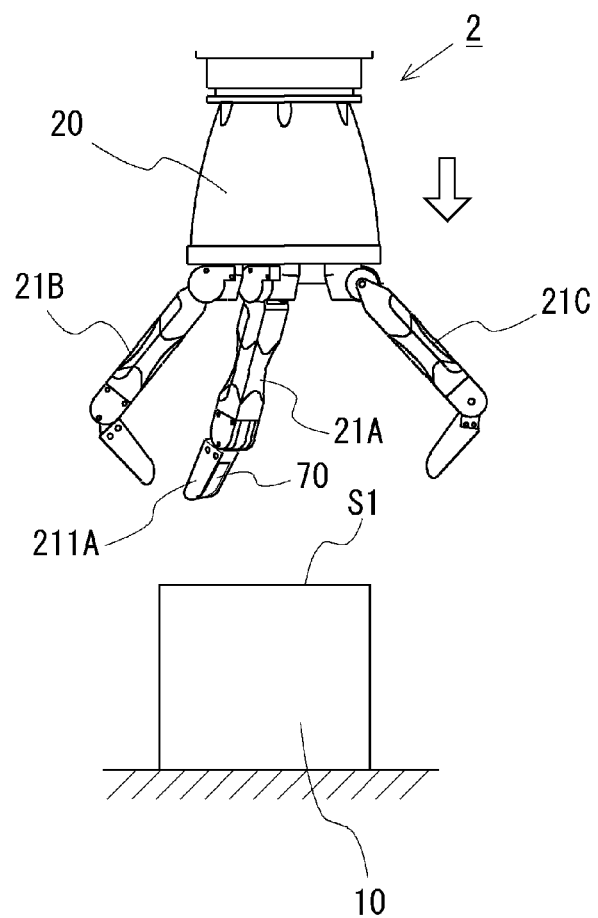

[Fig. 10B]
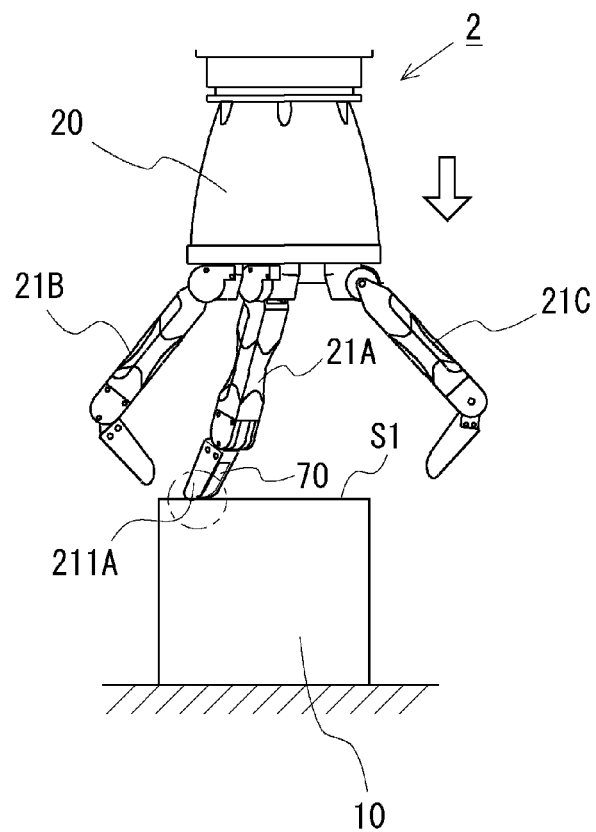

[Fig. 11]
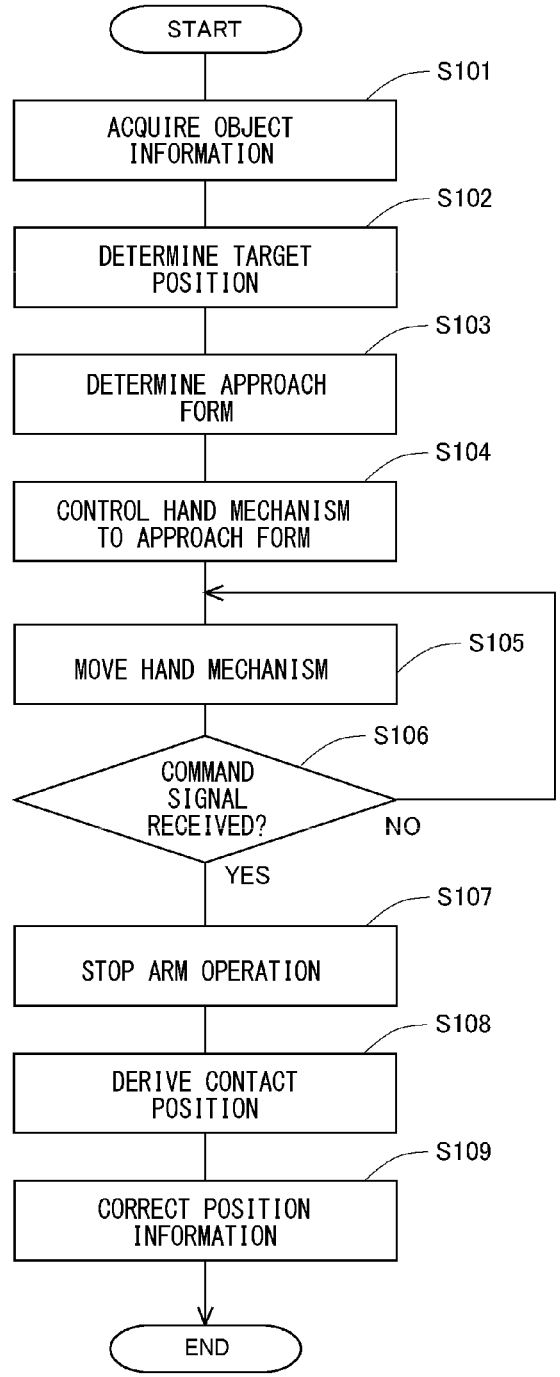

GRIPPING SYSTEM

TECHNICAL FIELD

The present invention relates to a gripping system having an arm mechanism and a hand mechanism attached to the arm mechanism.

BACKGROUND ART

A gripping system having an arm mechanism and a hand mechanism attached to the arm mechanism has been developed in the prior art. PTL 1, for example, discloses a robot device that includes a hand mechanism (a multi-fingered hand portion) having a plurality of finger portions and a robot arm having the hand mechanism attached to a tip end thereof. In this robot device, an arm control unit controls the robot arm and a hand control unit controls the hand mechanism on the basis of a work operation program. Further, in this robot device, a force sensor is provided on each finger portion of the hand mechanism, and the force sensor detects contact between the corresponding finger portion and an object. The robot device also includes a visual sensor that captures image data including the object. Position information indicating the position of the object is acquired on the basis of the image data captured by the visual sensor. Furthermore, the position information of the object, acquired from the image data, is corrected on the basis of information indicating a contact position derived on the basis of the output of the force sensor.

CITATION LIST

Patent Literature

[PTL 1] Japanese Patent No. 5505138

SUMMARY OF INVENTION

Technical Problem

In a gripping system such as that of the prior art described above, when an object is to be gripped by the hand mechanism, the position of the object can be ascertained with a higher degree of precision by bringing a predetermined site on the hand mechanism into contact with the object and deriving the contact position. Ascertaining the position of the object with a high degree of precision in this manner is highly desirable for improving the stability of the grip exerted on the object by the hand mechanism.

However, when the predetermined site of the hand mechanism is brought into contact with the object in order to ascertain the position of the object and the movement speed of the hand mechanism while coming into contact with the object is high, the object or the hand mechanism may be damaged. On the other hand, when the movement speed of the hand mechanism is reduced in order to suppress damage to the object or the hand mechanism, the takt time increases. Therefore, to suppress an increase in the takt time while suppressing damage to the object or the hand mechanism caused by contact between the hand mechanism and the object, the operation of the arm mechanism for moving the hand mechanism must be stopped as soon as the hand mechanism contacts the object.

However, in a typical gripping system having an arm mechanism and a hand mechanism, such as that of the prior art described above, an arm control device is provided to control the arm mechanism, and a hand control device is provided to control the hand mechanism. In the prior art described above, for example, when contact between a finger portion of the hand mechanism and the object is detected, detection information (i.e. the output of the force sensor) is first input into the hand control unit. The arm control unit then controls the robot arm on the basis of the work operation program in order to stop the operation of the robot arm. Hence, in this control procedure, input of the detection information into the hand control unit and the work operation program are interposed between the point at which contact between the hand mechanism and the object is detected and the point at which the operation of the robot arm is stopped by the arm control unit. As a result, it is difficult to stop the operation of the robot arm as soon as the hand mechanism contacts the object.

The present invention has been designed in consideration of this problem, and an object thereof is to provide a technique for a gripping system having an arm mechanism and a hand mechanism attached to the arm mechanism, by which an operation of the arm mechanism can be stopped as soon as the hand mechanism contacts an object.

Solution to Problem

A gripping system according to the present invention includes an arm mechanism, a hand mechanism that is attached to the arm mechanism and grips an object using a plurality of finger portions, an arm control device configured to control the arm mechanism, a hand control device configured to control the hand mechanism, a contact detection unit provided in the hand mechanism and configured to detect that a predetermined site of the hand mechanism has come into contact with the object, and a signal transmission unit that is provided in the hand mechanism and electrically connected to the arm control device, wherein the signal transmission unit transmits a command signal to stop an operation of the arm mechanism directly to the arm control device at the point Where the contact detection unit detects that the predetermined site of the hand mechanism has come into contact with the object.

Advantageous Effects of Invention

According to the present invention, in a gripping system having an arm mechanism and a hand mechanism attached to the arm mechanism, the operation of the arm mechanism can be stopped as soon as the hand mechanism contacts an object.

BRIEF DESCRIPTION OF DRAWINGS

FIG. 1 is a schematic view showing a configuration of a robot arm according to an embodiment.

FIG. 2 is a perspective view of a hand mechanism according to this embodiment.

FIG. 3 is a top view of the hand mechanism according to this embodiment.

FIG. 4 is a side view of a finger portion of the hand mechanism according to this embodiment.

FIG. 5 is a view showing a tip end portion side of the finger portion of the hand mechanism according to this embodiment from the direction of an arrow A in FIG. 4.

FIG. 6 is a view showing a movement range of a second joint portion of the finger portion on the hand mechanism according to this embodiment.

FIG. 7 is a view showing a movement range of a first joint portion of the finger portion on the hand mechanism according to this embodiment.

FIG. 8 is a view showing an arrangement of pressure sensors on a first link portion of the finger portion of the hand mechanism according to this embodiment.

FIG. 9 is a block diagram showing function units included respectively in an arm control device and a hand control device according to this embodiment.

FIG. 10A is a first view showing a state of the hand mechanism in time series during execution of search operation control according to this embodiment.

FIG. 10B is a second view showing a state of the hand mechanism in time series during execution of the search operation control according to this embodiment.

FIG. 11 is a flowchart showing a flow of the search operation control according to this embodiment.

DESCRIPTION OF EMBODIMENTS

A specific embodiment of the present invention will be described below on the basis of the figures. Unless specified otherwise, the technical scope of the invention is not limited only to the dimensions, materials, shapes, relative arrangements, and so on of constituent components described in this embodiment.

In the gripping system according to the present invention, an arm mechanism is controlled by an arm control device, and a hand mechanism is controlled by a hand control device. Further, the hand mechanism is provided with a contact detection unit for detecting that a predetermined site of the hand mechanism has come into contact with an object. The hand mechanism is also provided with a signal transmission unit that is electrically connected to the arm control device. At the point where the contact detection unit detects that the predetermined site of the hand mechanism has come into contact with the object, a command signal to stop the operation of the arm mechanism is transmitted directly from the signal transmission unit to the arm control device.

According to this configuration, when the contact detection unit detects that the hand mechanism has come into contact with the object, the command signal is transmitted directly to the arm control device from the signal transmission unit provided in the hand mechanism, without passing through a hand control unit or the like. As a result, the operation of the arm mechanism can be stopped as soon as the hand mechanism contacts the object.

Embodiment

A specific embodiment of the present invention will be described below on the basis of the figures. Unless specified otherwise, the technical scope of the invention is not limited only to the dimensions, materials, shapes, relative arrangements, and so on of the constituent components described in this embodiment.

Here, a case in which the hand mechanism and gripping system according to the present invention are applied to a robot arm will be described. FIG. 1 is a schematic view showing a configuration of the robot arm according to this embodiment. A robot arm 1 includes a hand mechanism 2, an arm mechanism 3, and a support portion 4. The hand mechanism 2 is attached to one end of the arm mechanism 3. Further, the other end of the arm mechanism 3 is attached to the support portion 4. The hand mechanism 2 includes a base portion 20 connected to the arm mechanism 3, and four finger portions 21 provided on the base portion 20. Note that the configuration of the hand mechanism 2 will be described in detail below.

(Arm Mechanism)

The arm mechanism 3 includes a first arm link portion 31, a second arm link portion 32, a third arm link portion 33, a fourth arm link portion 34, a fifth arm link portion 35, and a connecting member 36. The base portion 20 of the hand mechanism 2 is connected to a first joint portion 30a formed on one end side of the first arm link portion 31 of the arm mechanism 3. A motor (not shown) for rotating the hand mechanism 2 relative to the first arm link portion 31 about the first arm link portion 31 is provided in the first joint portion 30a. The other end side of the first arm link portion 31 is connected to one end side of the second arm link portion 32 by a second joint portion 30b. The first arm link portion 31 and the second arm link portion 32 are connected so that respective central axes thereof intersect perpendicularly. A motor (not shown) for rotating the first arm link portion 31 relative to the second arm link portion 32 about the other end side thereof is provided in the second joint portion 30b. Further, the other end side of the second arm link portion 32 is connected to one end side of the third arm link portion 33 by a third joint portion 30c. A motor (not shown) for rotating the second arm link portion 32 relative to the third arm link portion 33 is provided in the third joint portion 30c.

Similarly, the other end side of the third arm link portion 33 is connected to one end side of the fourth arm link portion 34 by a fourth joint portion 30d. Furthermore, the other end side of the fourth arm link portion 34 is connected to the fifth arm link portion 35 by a fifth joint portion 30e. A motor (not shown) for rotating the third arm link portion 33 relative to the fourth arm link portion 34 is provided in the fourth joint portion 30d. Moreover, a motor (not shown) for rotating the fourth arm link portion 34 relative to the fifth arm link portion 35 is provided in the fifth joint portion 30e. Further, the fifth arm link portion 35 is connected to the connecting member 36, which is disposed to extend vertically from the support portion 4, by a sixth joint portion 30f. The fifth arm link portion 35 and the connecting member 36 are connected so that respective central axes thereof are coaxial. A motor (not shown) for rotating the fifth arm link portion 35 about the fifth arm link portion 35 and the connecting member 36 is provided in the sixth joint portion 30f. By configuring the arm mechanism 3 in this manner, the arm mechanism 3 can be realized as a mechanism having six degrees of freedom, for example.

(Hand Mechanism)

Next, the configuration of the hand mechanism 2 will be described on the basis of FIGS. 2 to 8. FIG. 2 is a perspective view of the hand mechanism 2, and FIG. 3 is a top view of the hand mechanism 2. Note that in FIG. 3, arrows represent rotation ranges of the respective finger portions 21. As shown in FIGS. 2 and 3, in the hand mechanism 2, the four finger portions 21 are disposed on the base portion 20 at equal angular intervals (more specifically, at 90 deg intervals) on a circumference centering on a longitudinal direction (a perpendicular direction to the paper surface in FIG. 3) axis of the hand mechanism 2. Further, the four finger portions 21 all have identical structures and identical lengths. Note, however, that the operations of the respective finger portions 21 are controlled independently. Further, a signal transmission unit 71 that is electrically connected to an arm control device 42 for controlling the arm mechanism 3, to be described below, is built into the base portion 20. Functions of the signal transmission unit 71 will be described below.

FIGS. 4 to 8 are views illustrating the configuration of one finger portion 21 of the hand mechanism 2. FIG. 4 is a side view of the finger portion 21. Note that in FIG. 4, the base portion 20 is depicted in a see-through state so that the part of the internal structure of the finger portion 21 positioned inside the base portion 20 can also be seen. Further, FIG. 5 is a view showing a tip end portion side of the finger portion 21 from the direction of an arrow A in FIG. 4. Note that in FIGS. 4 and 5, a part of a second finger link portion 212 of the finger portion 21, to be described below, is depicted in a see-through state so that the internal structure of the second finger link portion 212 can also be seen.

As shown in FIGS. 2 and 4, each finger portion 21 includes a first finger link portion 211, the second finger link portion 212, and a base end portion 213. The base end portion 213 of the finger portion 21 is connected to the base portion 20. Here, the base end portion 213 is connected to the base portion 20 so as to be capable of rotating relative to the base portion 20 about a longitudinal direction (a perpendicular direction to the paper surface in FIG. 3) axis of the finger portion 21. Further, on the finger portion 21, one end of the second finger link portion 212 is connected to the base end portion 213. A second joint portion 23 is formed in a connecting portion between the second finger link portion 212 and the base end portion 213. Furthermore, as shown in FIGS. 4 and 5, on the finger portion 21, one end of the first finger link portion 211 is connected to the other end of the second finger link portion 212. A first joint portion 22 is formed in a connecting portion between the first finger link portion 211 and the second finger link portion 212.

Further, as shown in FIG. 4, a second motor 52 and a third motor 53 are provided in the interior of the base portion 20. The third motor 53 is a motor for driving the base end portion 213 to rotate about a shaft thereof. The base end portion 213 is driven to rotate by transmitting rotary force from the third motor 53 to a rotary shaft of the base end portion 213 through a gear, and as a result, the entire finger portion 21 is driven to rotate within a range indicated by arrows in FIG. 3. Further, the second motor 52 is a motor provided in the second joint portion 23 for driving the second finger link portion 212 to rotate relative to the base end portion 213. Rotary force from the second motor 52 is transmitted to a rotary shaft of the second finger link portion 212 through a worm gear. As a result, the second finger link portion 212 is driven to rotate relative to the base end portion 213 within a range indicated by arrows in FIG. 6. As shown in FIG. 6, the second joint portion 23 is formed to be capable of bending and extending. Note that the driving force generated by the second motor 52 and the driving force generated by the third motor 53 are transmitted to the respective operation subjects thereof independently.

Furthermore, as shown in FIGS. 4 and 5, a first motor 51 is provided in the interior of the second finger link portion 212. The first motor 51 is a motor provided in the first joint portion 22 for driving the first finger link portion 211 to rotate relative to the second finger link portion 212. Rotary force from the first motor 51 is transmitted to a rotary shaft of the first finger link portion 211 through a gear. As a result, the first finger link portion 211 is driven to rotate relative to the second finger link portion 212 within a range indicated by arrows in FIG. 7. As shown in FIG. 7, the first joint portion 22 is formed to be capable of bending and extending.

Moreover, as shown in FIGS. 2, 4, 5, and 8, in this embodiment, a pressure sensor 70 is provided on the tip end side of the first finger link portion 211 of the finger portion 21. The pressure sensor 70 is a sensor for detecting external force (pressure) acting on the tip end portion of the first finger link portion 211. Furthermore, as shown in FIG. 4, the pressure sensor 70 is provided on the first finger link portion 211 on both a wall surface (also referred to hereafter as a "bending-side wall surface") 215 on a bending direction side of the first joint portion 22 and a wall surface (also referred to hereafter as an "extension-side wall surface") 216 on an extension direction side of the first joint portion 22. Here, in this embodiment, the bending-side wall surface 215 on the tip end side of the first finger link portion 211 is formed in a curved surface shape. Accordingly, as shown in FIG. 8, a plurality of pressure sensors 70 may be arranged on the bending-side wall surface 215 on the tip end side of the first finger link portion 211 so as to extend along the curved surface shape thereof. Note that a sensor employing any known method, such as a piezoelectric sensor, a strain gauge, or an electrostatic capacitance sensor, may be used as the pressure sensor 70.

(Support Portion)

Next, configurations of an arm control device 42 and a hand control device 43 built into the support portion 4 will be described on the basis of FIG. 9. The arm control device 42 is a control device for controlling the arm mechanism 3 of the robot arm 1. The hand control device 43 is a control device for controlling the hand mechanism 2 of the robot arm 1. FIG. 9 is a block diagram showing respective function units included in the arm control device 42 and the hand control device 43.

The arm control device 42 is configured to include a plurality of drivers that generate drive signals for driving the motors provided in the respective joint portions of the arm mechanism 3, the drive signal from each driver being supplied to the corresponding motor. The arm control device 42 also includes a computer having a calculation processing device and a memory. The arm control device 42 further includes an arm control unit 420 and a motor state quantity acquisition unit 421 as function units. These function units are formed by having the computer included in the arm control device 42 execute a predetermined control program.

The arm control unit 420 controls the motors provided respectively in the joint portions 30a, 30b, 30c, 30d, 30e, 30f of the arm mechanism 3 by supplying the drive signals from the respective drivers thereto on the basis of object information acquired by an object information acquisition unit 430, to be described below, which serves as a function unit of the hand control device 43, and position information indicating the position of the object 10, the position information having been corrected by a position information correction unit 435, to be described below, which serves as a function unit of the hand control device 43. The arm control unit 420 moves the arm mechanism 3 by controlling the respective motors, whereby the hand mechanism 2 is moved to a predetermined gripping position suitable for gripping an object. Further, each of the motors provided in the joint portions 30a, 30b, 30c, 30d, 30e, 30f of the arm mechanism 3 is provided with an encoder (not shown) for detecting state quantities (a rotation position and a rotation speed of the rotary shaft of the motor, and so on) relating to the rotation state of the corresponding motor. The state quantities of the motors, detected by the encoders of the respective motors, are input into the motor state quantity acquisition unit 421 of the arm control device 42. Then, on the basis of the state quantities of the respective motors, input into the motor state quantity acquisition unit 421, the arm control unit 420 servo-controls the respective motors so that the hand mechanism 2 moves to the predetermined gripping position, for example.

Furthermore, as described above, the signal transmission unit 71 built into the base portion 20 of the hand mechanism 2 is electrically connected to the arm control device 42. As a result, signals can be transmitted directly from the signal transmission unit 71 to the arm control device 42. More specifically, as will be described below, when it is necessary to stop the operation of the arm mechanism 3, a command signal to stop the operation of the arm mechanism 3 can be transmitted directly to the arm control device 42 from the signal transmission unit 71.

Further, the hand control device 43 is configured to include a plurality of drivers that generate drive signals for driving the motors provided in the hand mechanism 2, the drive signal from each driver being supplied to the corresponding motor. The hand control device 43 also includes a computer having a calculation processing device and a memory. The hand control device 43 includes the object information acquisition unit 430, a hand control unit 431, a motor state quantity acquisition unit 432, a sensor information acquisition unit 433, a contact position derivation unit 434, and the position information correction unit 435 as function units. These function units are formed by having the computer included in the hand control device 43 execute a predetermined control program.

The object information acquisition unit 430 acquires object information, which is information relating to an object to be gripped by the hand mechanism 2. Here, the object information includes information relating to the shape, dimensions, and position of the object, information indicating the surrounding environment of the object (information relating to items other than the object existing on the periphery of the object, for example information relating to the shape of a container housing the object or a row of objects in the container), and so on. The object information acquisition unit 430 may also acquire object information input by a user. Further, when a visual sensor for capturing an image that includes the object is provided, the object information acquisition unit 430 may acquire object information from an image captured by the visual sensor.

Furthermore, the hand control unit 431 controls the first motors 51, the second motors 52, and the third motors 53 for driving the respective finger portions 21 of the hand mechanism 2 by supplying drive signals from the drivers thereto on the basis of the object information acquired by the object information acquisition unit 430 and the position information of the object 10, which has been corrected by the position information correction unit 435. For example, the hand control unit 431 controls the first motors 51, the second motors 52, and the third motors 53 of the hand mechanism 2 so that the object is gripped by the hand mechanism 2, which has been moved to the predetermined gripping position by controlling the arm mechanism 3 using the arm control unit 420. Moreover, each first motor 51, each second motor 52, and each third motor 53 of the hand mechanism 2 is provided with an encoder (not shown) for detecting state quantities (the rotation position and rotation speed of the rotary shaft of the motor, and so on) relating to the rotation state of the corresponding motor. The state quantities of the motors 51, 52, 53, detected by the encoders of the motors 51, 52, 53, are input into the motor state quantity acquisition unit 432 of the hand control device 43. Then, on the basis of the state quantities of the motors 51, 52, 53, input into the motor state quantity acquisition unit 432, the hand control unit 431 servo-controls the motors 51, 52, 53 of the respective finger portions 21 so that the plurality of finger portions 21 grip the object, for example.

The hand control device 43 also includes the sensor information acquisition unit 433. Detection values from the pressure sensors 70 provided in the first finger link portion 211 of each finger portion 21 of the hand mechanism 2 are input into the sensor information acquisition unit 433. On the basis of the detection values from the pressure sensors 70, the hand control unit 431 can control the motors 51, 52, 53 of each of the finger portions 21. Furthermore, when one of the pressure sensors 70 detects that the corresponding finger portion 21 has come into contact with the object, the contact position is derived by the contact position derivation unit 434.

(Search Operation Control)

Here, in the robot arm 1 according to this embodiment, the object information acquisition unit 430 serving as one of the function units included in the hand control device 43 acquires object information including the position information of the object. However, the position information of the object, acquired by the object information acquisition unit 430, may include an error of a certain magnitude. For example, when position information indicating the position of an object is acquired from an image including the object, which is captured by a visual sensor, the position information of the object may include an error caused by the image capturing ability of the visual sensor. In order to grip the object using the hand mechanism 2 of the robot arm 1 with stability, however, it is desirable to control the arm mechanism 3 and the hand mechanism 2 after ascertaining the position information of the object with a high degree of precision.

Therefore, in the robot arm 1 according to this embodiment, before controlling the arm mechanism 3 and the hand mechanism 2 in order to grip an object, search operation control is implemented as a preparatory stage with the aim of ascertaining the position information of the object with a high degree of precision. The search operation control according to this embodiment will be described below on the basis of FIGS. 10A and 10B. FIGS. 10A and 10B are views showing states of the hand mechanism 2 in time series during execution of the search operation control according to this embodiment. The search operation control is realized by controlling the arm mechanism 3 using the arm control device 42 and controlling the hand mechanism 2 using the hand control device 43.

Note that for simplicity, FIGS. 10A and 10B show only three of the four finger portions 21 of the hand mechanism 2 (in other words, one of the four finger portions 21 has been omitted). Further, hereafter, the three finger portions 21 shown in FIGS. 10A and 10B will be referred to respectively as a first finger portion 21A, a second finger portion 21B, and a third finger portion 21C. Here, in the search operation control, a predetermined finger portion, among the four finger portions 21 of the hand mechanism 2, is brought into contact with the object. FIGS. 10A and 10B show an operation in a case where the first finger portion 21A is set as the predetermined finger portion brought into contact with the object 10. Further, FIGS. 10A and 10B show an operation performed with the aim of ascertaining position information in a vertical direction (an up-down direction in FIGS. 10A and 10B) of the object 10.

In the search operation control, as shown in FIG. 10A, the hand mechanism 2 is moved in the direction of the black-outlined arrow (a downward direction in FIG. 10A) so that the hand mechanism 2 approaches the object 10 in a state where the hand mechanism 2 has been set in an approach form, i.e. a form in which only the first finger portion 21A, among the four finger portions 21, contacts the object 10. At this time, the motors provided respectively in the joint portions 30a, 30b, 30c, 30d, 30e, 30f of the arm mechanism 3 and the first motors 51, second motors 52, and third motors 53 for driving the respective joint portions of the finger portions 21 of the hand mechanism 2 are servo-controlled by the arm control device 42 and the hand control device 43 so that the tip end portion of the first finger portion 21A moves toward a target position on the object 10. Here, the target position is determined on the basis of the object information acquired by the object information acquisition unit 430. At this time, the target position is set in a position in the interior of the object 10 when the object 10 is envisaged as existing in a position corresponding to the position information of the object 10, included in the object information acquired by the object information acquisition unit 430.

As shown in FIG. 10B, by controlling the arm mechanism 3 and the hand mechanism 2 so that the tip end portion of the first finger portion 21A moves toward the target position, determined as described above, in a state where the hand mechanism 2 has been set in the approach form, the tip end portion of the first finger portion 21A contacts an upper surface S1 of the object 10. Note that likewise in FIG. 10B, the black-outlined arrow represents the movement direction of the hand mechanism 2. Further, in FIG. 10B, a contact position between the upper surface S1 of the object 10 and the tip end portion of the first finger portion 21A is surrounded by a dot-dash line. When the tip end portion of the first finger portion 21A contacts the upper surface S1 of the object 10 in this manner, the contact is detected by the pressure sensor 70 provided in the first finger link portion 211A of the first finger portion 21A. At this time, the detection value of the pressure sensor 70 is acquired by the sensor information acquisition unit 433. When the pressure sensor 70 of the first finger portion 21A detects contact between the first finger portion 21A and the object 10, the contact position derivation unit 434 derives the contact position. Here, the contact position derivation unit 434 derives the contact position between the tip end portion of the first finger portion 21A and the object 10 on the basis of the state quantities of the respective motors of the arm mechanism 3, acquired by the motor state quantity acquisition unit 421 of the arm control device 42, and the state quantities of the respective motors of the hand mechanism 2, acquired by the motor state quantity acquisition unit 432 of the hand control device 43. The position information correction unit 435 then corrects the position information (the vertical direction position information) of the object 10, acquired by the object information acquisition unit 430, on the basis of contact position information relating to the contact position derived by the contact position derivation unit 434. As a result, the position information of the object 10 can be ascertained with a high degree of precision.

By executing this search operation control, the vertical direction position information of the object 10 can be ascertained with a high degree of precision, and as a result, the stability with which the hand mechanism 2 grips the object 10 thereafter can be improved. Further, in a case where a plurality of identical objects 10 are arranged at identical heights, by ascertaining the vertical direction position information of one of the objects 10 with a high degree of precision, the hand mechanism 2 can be controlled using the vertical direction position information of that object 10 as vertical direction position information relating to another of the objects 10 when the other object 10 is to be gripped.

Note, however, that in the search operation control described above, if the movement speed of the hand mechanism 2 is high when the tip end portion of the first finger portion 21A is brought into contact with the object 10 so that the operation of the arm mechanism 3 continues even after contact has been established, the first finger portion 21A or the object 10 may be damaged. More specifically, when the object 10 is hard, the first finger portion 21A may be damaged, and when the object 10 is soft, the object 10 may be damaged. On the other hand, if the movement speed of the hand mechanism 2 is reduced when bringing the first finger portion 21A into contact with the object 10 in order to suppress damage to the first finger portion 21A or the object 10, the time required to execute the search operation control serving as the preparatory stage of the control for gripping the object 10 lengthens. As a result, an overall increase in the takt time required to grip the object 10 occurs.

To suppress an increase in the takt time while suppressing damage to the first finger portion 21A of the hand mechanism 2 or the object 10 caused by contact between the first finger portion 21A and the object 10, the operation of the arm mechanism 3 that moves the hand mechanism 2 must be stopped as soon as the first finger portion 21A contacts the object 10. To satisfy this requirement, the hand mechanism 2 according to this embodiment is provided with the signal transmission unit 71 described above. During the search operation control, at the point where the pressure sensor 70 of the first finger portion 21A detects contact between the first finger portion 21A and the object 10, a command signal to stop the operation of the arm mechanism 3 is transmitted directly from the signal transmission unit 71 to the arm control unit 420 of the arm control device 42.

Accordingly, the operation of the arm mechanism 3 for moving the hand mechanism 2 toward the object 10, as indicated by the black-outlined arrow in FIGS. 10A and 10B, can be stopped as soon as the first finger portion 21A contacts the object 10. More specifically, the operation of the arm mechanism 3 can be stopped more quickly than in a case where a command signal to stop the operation of the arm mechanism 3 is transmitted to the arm control device 42 by the hand control device 43 after the pressure sensor 70 has detected contact between the first finger portion 21A and the object 10 and the detection value of the pressure sensor 70 at this time has been acquired by the sensor information acquisition unit 433 of the hand control device 43. Thus, while keeping the movement speed of the hand mechanism 2 to a minimum, the occurrence of a situation in which the operation of the arm mechanism 3 continues for a certain period even after the tip end portion of the first finger portion 21A has come into contact with the object 10 so that the hand mechanism 2 continues to approaches the object 10 can be suppressed. As a result, an increase in the takt time can be suppressed, and damage to the first finger portion 21A or the object 10 due to the search operation control can also be suppressed.

(Flow of Search Operation Control)

Next, the flow of the search operation control will be described on the basis of a flowchart shown in FIG. 11. The flow of the search operation control is realized by executing a predetermined control program in the arm control device 42 and the hand control device 43. In this flow, first, in S101, object information relating to an object serving as a current gripping subject is acquired by the object information acquisition unit 430.

Next, in S102, the target position of the current search operation control is determined on the basis of the object information acquired by the object information acquisition unit 430 in S101. Next, in S103, the approach form of the hand mechanism 2 during the current search operation control is determined on the basis of the object information acquired by the object information acquisition unit 430 in S101. Here, as described above, during the search operation control, a predetermined finger portion, among the four finger portions 21 of the hand mechanism 2, is brought into contact with the object. At this time, the finger portion selected as the predetermined finger portion to be brought into contact with the object in the approach form determined in S103 will also be referred to below as the "search finger portion". Next, in S104, the form of the hand mechanism 2 is controlled to the approach form determined in S103. Note that the processing of S101 to S104 is executed by the hand control unit 431.

Next, in S105, the arm mechanism 3 is controlled by the arm control unit 420 in order to move the hand mechanism 2 so that the tip end portion of the search finger portion of the hand mechanism 2 is oriented toward the target position determined in S102. Note that at this time, the hand mechanism 2 is maintained in the approach form by the hand control unit 431. Next, in S106, a determination is made as to whether or not the arm control device 42 has received a command signal to stop the operation of the arm mechanism 3 from the signal transmission unit 71 of the hand mechanism 2. If, at this time, the pressure sensor 70 of the search finger portion has detected contact with the object 10, this means that the command signal has been transmitted from the signal transmission unit 71, and therefore an affirmative determination is made in S106. If, on the other hand, the pressure sensor 70 of the search finger portion has not yet detected contact with the object 10, this means that the command signal has not been transmitted from the signal transmission unit 71, and therefore a negative determination is made in S106.

When an affirmative determination is made in S106, the operation of the arm mechanism 3 is stopped at that point by the arm control unit 420 in S107. When a negative determination is made in S106, on the other hand, the processing of S105 is continued.

Following S107, the contact position in which contact with the object 10 was detected by the pressure sensor 70 of the search finger portion is derived by the contact position derivation unit 434 in S108. Next, in S109, the position information of the object, acquired by the object information acquisition unit 430, is corrected by the position information correction unit 435 on the basis of contact position information relating to the contact position derived by the contact position derivation unit 434 in S108.

Note that in the search operation control of the example described above, the vertical direction position information of the object is ascertained, but similar search operation control may be applied in a case where horizontal direction position information of the object is to be ascertained. In this case, the hand mechanism 2 may be caused to approach the object from a horizontal direction in a state where the hand mechanism 2 has been set in the approach form. Likewise in this case, similar control to the search operation control described above can be executed after the tip end portion of the first finger portion 21A contacts the object.

Furthermore, in this embodiment, any type of well-known sensor, such as a piezoelectric sensor, a strain gauge, or an electrostatic capacitance sensor, may be used as the pressure sensor 70. Note that in this embodiment, the pressure sensor 70 corresponds to a "contact detection unit" according to the present invention. Further, when external force (pressure) acts on the tip end portion of the first finger link portion 211, the load applied to the first motor 51 varies. Therefore, an ammeter that detects variation in the load applied to the first motor 51 as variation in a current value may be used as the "contact detection unit" according to the present invention instead of the pressure sensor 70.

Moreover, in the case of the search operation control described above, the part of the first finger link portion 211A of the first finger portion 21A on which the pressure sensor 70 is disposed corresponds to a "predetermined site" according to the present invention. However, the "predetermined site" according to the present invention does not necessarily have to be the tip end portion of a finger portion of the hand mechanism. For example, when the first finger portion 21A of the hand mechanism 2 is set as the predetermined finger portion to be brought into contact with the object 10, as in the search operation control described above, the second finger link portion 212A of the first finger portion 21A may be brought into contact with the object. In this case, the pressure sensor is disposed on the second finger link portion 212A. Accordingly, the part of the second finger link portion 212A on which the pressure sensor is disposed corresponds to the "predetermined site" according to the present invention.

REFERENCE SIGNS LIST

1 Robot arm
2 Hand mechanism
20 Base portion
21 Finger portion
22 First joint portion
23 Second joint portion
211 First finger link portion
212 Second finger link portion
213 Base end portion
3 Arm mechanism
30a First joint portion
30b Second joint portion
30c Third joint portion
30d Fourth joint portion
30e Fifth joint portion
30f Sixth joint portion
31 First arm link portion
32 Second arm link portion
33 Third arm link portion
34 Fourth arm link portion
35 Fifth arm link portion
36 Connecting member
4 Support portion
42 Arm control device
420 Arm control unit
421 Motor state quantity acquisition unit
43 Hand control device
430 Object information acquisition unit
431 Hand control unit
432 Motor state quantity acquisition unit
433 Sensor information acquisition unit
51 First motor
52 Second motor
53 Third motor
70 Pressure sensor
71 Signal transmission unit

The invention claimed is:

1. A gripping system comprising:
an arm mechanism;
a hand mechanism that is attached to the arm mechanism and grips an object using a plurality of finger portions;

an arm controller configured to control the arm mechanism;

a hand controller configured to control the hand mechanism;

a sensor provided in the hand mechanism and configured to detect that a predetermined site of the hand mechanism has come into contact with the object; and a signal transmitter that is provided in the hand mechanism and electrically connected to the arm controller, wherein the signal transmitter transmits a command signal to stop an operation of the arm mechanism directly to the arm controller at the point where the sensor detects that the predetermined site of the hand mechanism has come into contact with the object, wherein the hand mechanism includes a base portion connected to the arm mechanism, the plurality of finger portions are provided on the base portion, and the signal transmitter is built into the base portion.

2. The gripping system according to claim 1, wherein the hand controller acquires position information indicating the position of the object and corrects the position information of the object, acquired by the hand controller, the arm controller controls the arm mechanism so that the predetermined site on the hand mechanism moves toward a target position on the object, the target position being determined on the basis of the position information of the object, acquired by the hand controller, the arm controller stops the operation of the arm mechanism when the command signal is transmitted to the arm controller from the signal transmitter after the sensor detects that the predetermined site of the hand mechanism has come into contact with the object, and the hand controller corrects the position information of the object, acquired by the hand controller, on the basis of contact position information relating to a contact position at the point where the sensor detects that the predetermined site of the hand mechanism has come into contact with the object.

3. The gripping system according to claim 2, wherein the arm controller and the hand controller control the arm mechanism and the hand mechanism on the basis of the position information of the object which has been corrected by the hand controller, so that the object is gripped by the hand mechanism.

4. The gripping system according to claim 1, wherein the predetermined site is a site on a tip end side of a joint portion of a predetermined finger portion among the plurality of finger portions.

* * * * *